United States Patent
Izawa et al.

(10) Patent No.: US 12,135,059 B2
(45) Date of Patent: Nov. 5, 2024

(54) SLIDING MEMBER AND MEMBER FOR INTERNAL COMBUSTION ENGINE

(71) Applicants: NISSAN MOTOR CO., LTD., Yokohama (JP); FUKUDA METAL FOIL & POWDER CO., LTD., Kyoto (JP)

(72) Inventors: Yoshinori Izawa, Kanagawa (JP); Junichi Arai, Kanagawa (JP); Katsunori Otobe, Kyoto (JP); Shinichi Nishimura, Kyoto (JP)

(73) Assignees: NISSAN MOTOR CO., LTD., Yokohama (JP); FUKUDA METAL FOIL & POWDER CO., LTD., Kyoto (JP)

( * ) Notice: Subject to any disclaimer, the term of this patent is extended or adjusted under 35 U.S.C. 154(b) by 681 days.

(21) Appl. No.: 17/262,333

(22) PCT Filed: Jun. 19, 2019

(86) PCT No.: PCT/JP2019/024245
§ 371 (c)(1),
(2) Date: Jan. 22, 2021

(87) PCT Pub. No.: WO2020/026628
PCT Pub. Date: Feb. 6, 2020

(65) Prior Publication Data
US 2021/0293274 A1 Sep. 23, 2021

(30) Foreign Application Priority Data
Aug. 2, 2018 (JP) .................................. 2018-146270

(51) Int. Cl.
*C22C 9/06* (2006.01)
*C23C 24/04* (2006.01)
(Continued)

(52) U.S. Cl.
CPC ................ *F16C 33/12* (2013.01); *C22C 9/06* (2013.01); *C23C 24/04* (2013.01); *C23C 30/00* (2013.01); *F02F 3/10* (2013.01)

(58) Field of Classification Search
None
See application file for complete search history.

(56) References Cited

U.S. PATENT DOCUMENTS

| 4,995,924 A | 2/1991 | Akutsu |
| 5,188,799 A | 2/1993 | Mori et al. |

(Continued)

FOREIGN PATENT DOCUMENTS

| EP | 3 333 283 A1 | 6/2018 |
| JP | 63-238258 A | 10/1988 |

(Continued)

OTHER PUBLICATIONS

Smallman, Modern Physical Metallurgy and Materials Engineering, 1999, Elsevier, 6th Edition, pp. 259-296 (Chapter 8: Strengthening and toughening). (Year: 1999).*

(Continued)

*Primary Examiner* — Xiaobei Wang
(74) *Attorney, Agent, or Firm* — Foley & Lardner LLP

(57) ABSTRACT

A sliding member of the present invention includes a base material and a coating layer that is formed on the base material. The coating layer includes a particle aggregate that contains precipitation hardened copper alloy particles. The precipitation hardened copper alloy particles contain cobalt (Co) and silicon (Si). The sliding member has high coating strength and superior wear resistance.

10 Claims, 1 Drawing Sheet

(51) Int. Cl.
C23C 30/00 (2006.01)
F02F 3/10 (2006.01)
F16C 33/12 (2006.01)

(56) References Cited

U.S. PATENT DOCUMENTS

| | | | |
|---|---|---|---|
| 2001/0021353 A1* | 9/2001 | Sakai | C22C 32/0089 420/470 |
| 2006/0063023 A1* | 3/2006 | Barbezat | F16C 33/121 427/427 |
| 2006/0093736 A1 | 5/2006 | Raybould et al. | |
| 2018/0214993 A1 | 8/2018 | Tanaka et al. | |
| 2018/0223902 A1* | 8/2018 | Izawa | C23C 30/00 |

FOREIGN PATENT DOCUMENTS

| | | |
|---|---|---|
| JP | 05-140678 A | 6/1993 |
| JP | 07-48665 A | 2/1995 |
| JP | 2006-097134 A | 4/2006 |
| JP | 2008-144253 A | 6/2008 |
| JP | 2008-519157 A | 6/2008 |
| JP | 2011-219860 A | 11/2011 |
| JP | 2018-123388 A | 8/2018 |

OTHER PUBLICATIONS

International Preliminary Report on Patentability and English translation issued in International Application No. PCT/JP2019/024245 on Feb. 4, 2021, 14 pages.

* cited by examiner

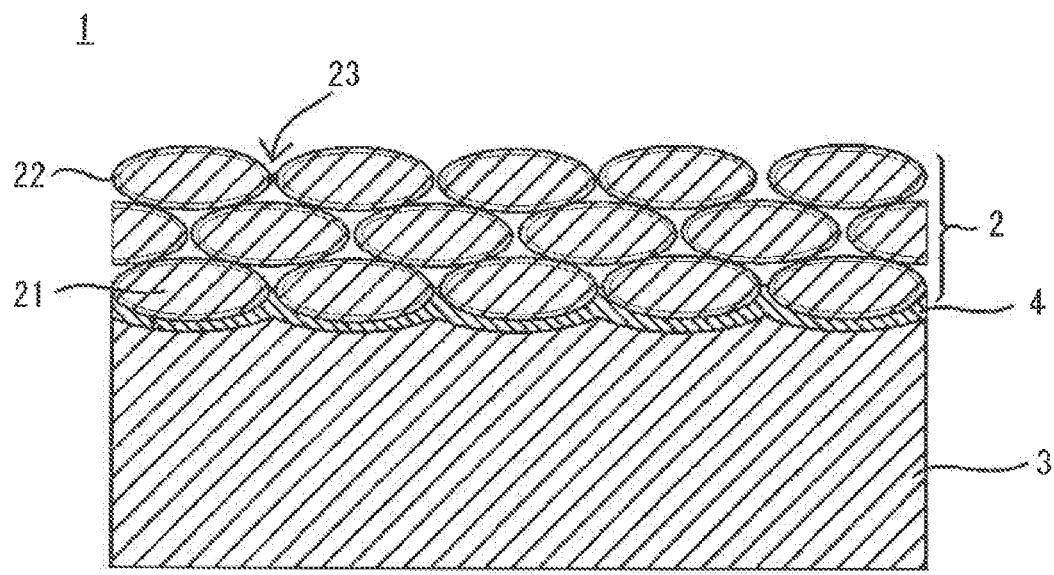

SLIDING MEMBER AND MEMBER FOR INTERNAL COMBUSTION ENGINE

TECHNICAL FIELD

The present invention relates to a sliding member, and more specifically relates to a sliding member having improved wear resistance.

BACKGROUND ART

Aluminum and aluminum alloy are light-weight and high-strength materials and are thus suitably used for reducing weight of, e.g., automobiles. Meanwhile, aluminum and aluminum alloy have low wear resistance, and therefore, in the case of using them in an internal combustion engine having a sliding part, a surface of a base material containing aluminum is covered in order to improve wear resistance.

Patent Document 1 discloses a method to cover a surface of a base material containing aluminum, with particles, by spraying the particles thereonto with the use of low temperature gas. The particles are metal particles, such as of titanium, nickel, iron, aluminum, cobalt, or copper, or the particles are alloy particles containing such metal. The sprayed particles are plastically deformed by kinetic energy and are bonded to the surface of the base material.

CITATION LIST

Patent Document
Patent Document 1: JP 2008-519157A

SUMMARY OF INVENTION

Technical Problem

However, according to the method disclosed in Patent Document 1, the coating layer cannot be formed unless the material particles, which are sprayed onto the base material, contain metal particles that are soft enough to plastically deform by spraying. For this reason, even if hard particles, such as of tungsten carbide or silicon nitride, are further added, it is difficult to improve strength of the entire coating layer, and wear resistance is not sufficiently obtained.

The present invention has been made in view of these problems in the conventional art, and an object thereof is to provide a sliding member having high coating strength and superior wear resistance.

Solution to Problem

The inventors of the present invention have made an intensive research to achieve the above object and have found the following findings. That is, the above object can be achieved by using high strength particles as material particles, the high strength particles having high deformability and sufficiently plastically deforming upon being sprayed onto a base material, and the high strength particles hardening after being bonded to the base material. Thus, the present invention has been completed.

That is, a sliding member of the present invention includes a base material and a coating layer that is formed on the base material.

The coating layer includes a particle aggregate that contains precipitation hardened copper alloy particles, and the precipitation hardened copper alloy particles contain cobalt (Co) and silicon (Si).

Moreover, a member for an internal combustion engine of the present invention includes a sliding part.

The sliding part is provided with the sliding member.

Advantageous Effects of Invention

In the present invention, the particle aggregate that contains the precipitation hardened copper alloy particles containing cobalt (Co) and silicon (Si) is used for covering. Thus, the present invention provides a sliding member having high coating strength and superior wear resistance.

BRIEF DESCRIPTION OF DRAWINGS

FIG. 1 is a sectional schematic view of a sliding member of the present invention.

DESCRIPTION OF EMBODIMENTS

<Sliding Member>

A sliding member of the present invention will be described in detail.

As illustrated in FIG. 1, the sliding member includes a base material 3 and a coating layer 2 that is formed on the base material, and the coating layer 2 includes a particle aggregate that contains precipitation hardened copper alloy particles 21. The precipitation hardened copper alloy particles 21 contain cobalt (Co) and silicon (Si).

The precipitation hardened copper alloy particles can be formed by spraying particles in a supersaturated solid solution state onto a surface of a base material with the use of a cold spray method, which will be described later. These particles contain copper as a main component.

When the particles in a solid phase state collide with the base material, an impact generates e.g., heat and stress, which cause precipitation and hardening of the component that is solid solved in an amount greater than the solid solubility limit. The particles in the supersaturated solid solution state thus become the precipitation hardened copper alloy particles.

Thus, when soft and highly deformable particles in the supersaturated solid solution state are sprayed in a solid phase state, and are collided with the surface of the base material, the particles in the supersaturated solid solution state and the base material are sufficiently plastically deformed, and the particles are melted due to locally generated heat or atomic diffusion occurs to strongly bond the particle to the base material or other particles. As a result, the coating strength is improved.

Then, after the particles in the supersaturated solid solution state are bonded to the base material, they harden by precipitation hardening and form a coating layer of a particle aggregate in which the precipitation hardened copper alloy particles are strongly bonded to each other. Thus, a sliding member that has superior wear resistance can be formed.

In addition, most of the particles in the supersaturated solid solution state, due to their high deformability, are bonded to the base material upon being sprayed onto the base material, and the number of particles that rebound and are wasted is small, whereby production efficiency is high, and cost can be reduced.

Cobalt (Co) and silicon (Si) have a low solid solubility limit with respect to copper, and the precipitation hardened copper alloy particles containing cobalt (Co) and silicon (Si) form a precipitated phase, because fine crystal grains containing cobalt silicide ($Co_2Si$) are precipitated in a large amount. For this reason, the precipitation hardened copper alloy particles containing cobalt (Co) and silicon (Si) have high hardness and superior wear resistance.

Moreover, in the precipitation hardened copper alloy particles, cobalt silicide is precipitated, and solid solved amounts of cobalt and silicon are small, whereby a heat transfer path containing high concentration of copper is formed. This increases a thermal conductivity of the coating layer and improves a cooling performance, resulting in improvement in heat resistance.

In addition, the cobalt and silicon that are contained in the precipitation hardened copper alloy particles and in the particles in the supersaturated solid solution state form a stable film of cobalt oxides and/or $SiO_2$ by diffusing to a surface, and the film acts as a passive film to improve corrosion resistance of the coating layer.

Any particles that contain copper as a main component and that contain cobalt (Co) and silicon (Si) as additional elements, can be used as the particles in the supersaturated solid solution state. Examples of the particles in the supersaturated solid solution state include Cu—Co—Si alloy particles and Cu—Ni—Co—Si alloy particles. Note that the phrase "main component" in the present invention means a component that is contained in an amount of 80 mass % or greater.

Although depending on the composition of the precipitation hardened copper alloy particles that compose the coating layer, the content of cobalt is preferably 0.8 mass % to 4 mass %, and more preferably 1.0 mass % to 3.0 mass %. In addition, the total content of cobalt and nickel is preferably 2.5 mass % to 3.5 mass %.

When the content of cobalt is less than 0.8 mass %, the amount of precipitated crystal grains is decreased, and it may be difficult to obtain sufficient hardness. On the other hand, when cobalt is solid solved in an amount greater than 4 mass % even in the supersaturated solid solution state, deformability of the particles is reduced, which makes it difficult to form the coating layer by a cold spray method.

The precipitation hardened copper alloy particles preferably contain at least one kind selected from the group consisting of nickel (Ni), iron (Fe), and manganese (Mn), and the total content together with cobalt is preferably 2 mass % to 4 mass %.

The hardness of the particles in the supersaturated solid solution state is preferably 200 Hv or lower at normal temperature, although depending on the composition of the particles.

In case of hard copper alloy particles in which the solid solved amount of the additional elements is small and crystal grains are preliminarily precipitated, the precipitated crystal grains inhibit deformation of the copper alloy particles. Thus, the stress in collision cannot be absorbed and the copper alloy particles are broken, resulting in difficulty in formation of the coating layer.

The crystal grains in the precipitation hardened copper alloy particles are preferably nanocrystals that have an average grain size of smaller than 1 μm. When crystal grains in the precipitation hardened copper alloy particles are fine, the strength of the coating layer is improved.

The particles in the supersaturated solid solution state can be produced by a water atomizing method.

Specifically, these particles can be produced such that melted metal is flowed down, and high pressure water is blown thereto, whereby the melted metal is atomized and is rapidly cooled and solidified into particles.

An average size (D50) of the particles in the supersaturated solid solution state is preferably 20 to 40 μm.

Decreasing the average grain size of the particles in the supersaturated solid solution state enables forming a dense coating. However, particles having excessively small particle sizes hardly plastically deform when sprayed, due to having small kinetic energy, whereby adhesion between the particles may be reduced, and coating strength may be lowered.

In the coating layer, a porosity in cross section is preferably 3 area % or smaller, and preferably 1 area % or smaller. The coating layer being dense with a small amount of pores has improved coating strength and has improved wear resistance.

The porosity in cross section of the coating layer, and the average grain size of the precipitation hardened copper alloy particles, can be calculated by analyzing an image, which is obtained by binarizing a scanning electron microscope image (SEM image) in image processing. The average grain size is an equivalent circular diameter and is a diameter of a circle having the same area as a projected area of a particle image.

Although depending on temperature and sliding environment at a part at which the sliding member is used, the thickness of the coating layer is, for example, preferably from 0.05 to 5.0 mm, and more preferably from 0.1 to 0.5 mm.

When the thickness is less than 0.05 mm, strength of the coating layer itself may be insufficient, and plastic deformation may occur in case the strength of the base material is low. On the other hand, when the thickness exceeds 5.0 mm, the coating layer may easily come off in accordance with a relationship between interface adhesion strength and residual stress that occurs in deposition.

The base material is not specifically limited, and a metal that is conventionally used for a sliding member of an internal combustion engine can be used, but an aluminum alloy can be preferably used because of its high thermal conductivity.

Examples of the aluminum alloy include AC2A, AC8A, and ADC12, which are defined in Japanese Industrial Standards.

The sliding member is superior in wear resistance and can be suitably used for members having a sliding part for an internal combustion engine, for example, a piston, a piston ring, a piston pin, a cylinder, a crankshaft, a camshaft, and a valve lifter.

<Manufacturing Method of Sliding Member>

The sliding member can be manufactured by spraying particles in a supersaturated solid solution state onto a surface of a base material with the use of a cold spray method. The particles contain cobalt (Co) and silicon (Si) and contain copper as a main component.

The cold spray method is a method for forming a coating layer by making particles in a supersaturated solid solution state collide with a base material together with inert gas, in a supersonic flow, in a condition in which the particles are not melted and not gasified but in a solid phase state. The cold spray method can minimize oxidation of the coating layer due to heat, unlike a method for forming a coating layer by melting metal particles of a material, such as a thermal spraying method.

With the use of the cold spray method, in response to collision of the particles in the supersaturated solid solution state and in the solid phase state, with the base material, the particles themselves and the base material 3 are plastically deformed to form a plastically deformed part 22. Moreover, the component in the amount exceeding the solid solubility limit is precipitated and hardened, whereby the particles become precipitation hardened copper alloy particles 21.

Then, a part of kinetic energy is converted into thermal energy, and surfaces of the precipitation hardened copper alloy particles 21 are melted by the locally generated heat and are solidified, or atomic diffusion occurs, whereby the precipitation hardened copper alloy particles are bonded to each other, resulting in formation of the coating layer 2.

At this time, the temperatures of the base material 3 and the particles in the supersaturated solid solution state are at the melting point of the particles or lower. Thus, the locally melted surfaces of the particles in the supersaturated solid solution state are rapidly cooled to form amorphous substance and nanocrystals at interfaces 23 between the particles in the supersaturated solid solution state.

In the particle aggregate of the precipitation hardened copper alloy particles 21 thus formed, the surfaces of the precipitation hardened copper alloy particles 21 are locally melted and solidified, and particle aggregate of the entire coating layer is bonded into one body. The precipitation hardened copper alloy particles 21 do not form an uniform structure, but form the interfaces 23, and the plastically deformed parts 22 that contain amorphous substance and nanocrystals are present in the vicinity of the interfaces 23.

In this sense, it is different from a coating layer in which metal particles of a material are completely melted or dissolved and solidified to form an uniform structure without forming the plastically deformed part, by, e.g., thermal spraying.

In addition, an intermediate layer 4 that includes a diffusion layer and an intermetallic compound layer is formed between the base material 3 and the coating layer 2. Due to rapid cooling of the melted surfaces of the particles in the supersaturated solid solution state, the intermediate layer 4 is thinner than an intermediate layer that is formed by a thermal spraying method or sintering, and the intermediate layer 4 has a film thickness of 2 µm or less.

The amorphous substance at an interface of the precipitation hardened copper alloy particles, and the crystal grains in the precipitation hardened copper alloy particles, can be recognized by analyzing a crystal orientation from a projected pattern.

The projected pattern is obtained such that a diffraction pattern is projected on a detector surface by electron backscatter diffraction (EBSD) performed in a scanning electron microscope (SEM).

The spray velocity of the particles in the supersaturated solid solution state is preferably from 300 to 1200 m/s, and preferably from 500 to 1000 m/s. When the spray velocity is lower than 300 m/s, stress for plastically deforming the particles in the supersaturated solid solution state is small, whereby precipitation hardening may not be sufficient, and the porosity may increase.

The pressure of working gas for spraying the particles in the supersaturated solid solution state is preferably from 2 to 5 MPa, and more preferably from 3.5 to 5 MPa. When the pressure of the working gas is lower than 2 MPa, it may be difficult to obtain the above-described particle velocity.

Although depending on the kind of the particles in the supersaturated solid solution state, the temperature of the working gas is preferably from 400 to 800° C., and more preferably from 500 to 700° C.

When the temperature of the working gas is lower than 400° C., the particles in the supersaturated solid solution state hardly plastically deform, whereby the porosity may increase, and coating strength may be lowered. On the other hand, when the temperature of the working gas exceeds 800° C., strength may be decreased due to oxidation.

Examples of the working gas include nitrogen gas and helium gas, and they may be used alone or in combination.

EXAMPLES

The present invention will be detailed with reference to Examples hereinafter, but the present invention is not limited to Examples described below.

Example 1

In the state of being already worked into a seat of an engine valve of a cylinder head, an aluminum material (AS056BE-H112) was preprocessed on the condition that a target thickness of the coating layer was 0.2 mm, whereby an aluminum base material was prepared.

The aluminum base material was mounted on a rotation table, and particles in a supersaturated solid solution state (composition: (mass %) Cu—3Co—0.7Si, average particle size (d50): 26.3 µm) were cold sprayed under the following condition while the rotation table was rotated, whereby a coating layer of from 0.4 to 0.5 mm was formed.

The particles were produced by a water atomizing method.

A deposition rate of the particles in the supersaturated solid solution state is shown in Table 1.

High-pressure cold spray equipment: manufactured by Plasma Giken Kogyo Co., Ltd., PCS-1000
Working gas: nitrogen
Gas pressure in chamber: 4 MPa
Gas temperature in chamber: 600° C. (temperature of particles in collision was approximately 200° C.)
Particle velocity: from 680 to 720 m/s
Particle feed amount: 7 g/min The coating layer was finished into the shape of a seat of an engine valve of an actual cylinder head so as to have a thickness of 0.2 mm, whereby a sliding member was obtained.

Example 2

A sliding member was obtained in the same manner as in Example 1, except for using particles in a supersaturated solid solution state (composition: (mass %) Cu—0.8Ni-2.2Co—0.7Si, average particle size (d50): 26.1 µm).

Example 3

A sliding member was obtained in the same manner as in Example 1, except for using particles in a supersaturated solid solution state (composition: (mass %) Cu—1.5Ni-1.5Co—0.7Si, average particle size (50): 26.2 µm).

Example 4

A sliding member was obtained in the same manner as in Example 1, except for using particles in a supersaturated solid solution state (composition: (mass %) Cu—2.2Ni-0.8Co—0.7Si, average particle size (d50): 26.3 µm). [00SS]
[Comparative Example 1]

A sliding member was obtained in the same manner as in Example 1, except for using particles in a supersaturated solid solution state (composition: (mass %) Cu—3.0Ni—0.7Si, average particle size (d50): 27.7 µm).

Comparative Example 2

A sliding member was obtained in the same manner as in Example 1, except for using particles in a supersaturated solid solution state (composition: (mass %) Cu—14Ni—3Si-2V-2.2Cr—1.4Fe—1.2A1, average particle size (d50): 33.2 μm).

<Evaluation>

The sliding members were evaluated by the following methods. The results of the evaluation are shown in Table 1.

(Observation of Coating Structure)

Electron backscatter diffraction (EBSD) was performed by using a scanning electron microscope (SEM) to observe the structure of the coating layer, and existence of a plastically deformed part and an intermediate layer were confirmed from the composition of precipitated crystal grains in the precipitation hardened copper alloy particles, porosity, grain size of the precipitated crystal grains, and existence of amorphous substance.

(Wear Resistance)

A wear amount of the sliding member after a corrosion resistance test, was measured under the following condition by using a valve seat abrasion testing machine, which is manufactured by Takachiho Seiki Co., Ltd.

Specifically, the shapes of the seat of the engine valve of the cylinder head before and after the test, were obtained by using a shape measurement apparatus, and wear amounts of four positions were measured. The measured values were averaged, and a wear ratio relative to Comparative Example 1 was calculated from the average.

Mating valve member: SUH35
Test temperature: 325° C.
Vertical speed: 3000 times/min
Number of revolutions of valve: 5 rpm
Number of seating operations: 540000 times

REFERENCE SIGNS LIST

1 Sliding member
2 Coating layer
21 Precipitation hardened copper alloy particles
22 Plastically deformed part
23 Interface
3 Base material
4 Intermediate layer

The invention claimed is:

1. A sliding member comprising:
   a base material; and
   a coating layer that is formed on the base material,
   the coating layer including a particle aggregate that contains precipitation hardened copper alloy particles formed by cold spraying unmelted solid particles in a supersaturated solid solution state on the base material, and
   the precipitation hardened copper alloy particles containing cobalt (Co) and silicon (Si).

2. The sliding member according to claim 1, wherein an average grain size of crystal grains in the precipitation hardened copper alloy particles is smaller than 1 μm.

3. The sliding member according to claim 1, wherein a content of cobalt of the precipitation hardened copper alloy particles is 0.8 mass % to 4 mass %.

4. The sliding member according to claim 1, wherein the precipitation hardened copper alloy particles include a precipitated phase containing cobalt silicide ($Co_2Si$).

5. The sliding member according to claim 1, wherein the precipitation hardened copper alloy particles contain at least one of nickel (Ni), iron (Fe), and manganese (Mn), and a total content together with cobalt is 2 mass % to 4 mass %.

6. The sliding member according to claim 1, wherein at least one of the base material and the coating layer includes a plastically deformed part.

7. The sliding member according to claim 1, including at least one of an amorphous substance and a nanocrystal at an interface between the particles that form the coating layer.

TABLE 1

| | Solid Solution Particles in Supersaturated State | | | Coating Layer | | | | |
|---|---|---|---|---|---|---|---|---|
| | Composition (mass %) | Average Grain Size D50% | Deposition Rate | Precipitates in Precipitation Hardened Copper Particles | Porosity | Plastically Deformed Part | Intermediate Layer | Wear Ratio |
| Example 1 | Cu-3Co-0.7Si | 26.3 μm | 98.3% | $Co_2Si$ | 0.4% | Existed | Existed | 0.57 |
| Example 2 | Cu-0.8Ni-2.2Co-0.7Si | 26.1 μm | 98.3% | $Co_2Si$, $Ni_2Si$ | 0.5% | Existed | Existed | 0.65 |
| Example 3 | Cu-1.5Ni-1.5Co-0.7Si | 26.2 μm | 98.3% | $Ni_2Si$, $Co_2Si$ | 0.3% | Existed | Existed | 0,88 |
| Example 4 | Cu-2.2Ni-0.8Co-0.7Si | 26.3 μm | 98.2% | $Ni_2Si$, $Co_2Si$ | 0.4% | Existed | Existed | 0,67 |
| Comparative Example 1 | Cu-3.0Ni-0.7Si | 27.7 μm | 98.0% | $Ni_2Si$ | 0.1% | Existed | Existed | 1.00 |
| Comparative Example 2 | Cu-14Ni-3Si-2V-2.2Cf-1.4Fe-1.2Al | 33.2 μm | 70.9% | $Ni_2Si$ | 0.5% | Existed | Existed | 1.05 |

The results in Table 1 show that the coating layers of Examples containing cobalt and silicon had superior wear resistance, compared with the coating layers of Comparative Examples.

8. The sliding member according to claim 1, wherein a porosity in a cross section of the coating layer is 3 area % or less.

9. The sliding member according to claim 1, comprising an intermediate layer at least at a part between the base material and the coating layer, the intermediate layer containing at least one of a diffusion layer and an intermetallic compound layer.

10. A member for an internal combustion engine, comprising a sliding part, wherein the sliding part is provided with the sliding member according to claim 1.

\* \* \* \* \*